(12) United States Patent
Vieri (10) Patent No.: US 8,156,005 B2
(45) Date of Patent: Apr. 10, 2012

(54) SYSTEMS AND METHODS OF CONTEXTUAL ADVERTISING

(75) Inventor: Riccardo Vieri, Montespertoli (IT)

(73) Assignee: Braintexter, Inc., Austin, TX (US)

( * ) Notice: Subject to any disclaimer, the term of this patent is extended or adjusted under 35 U.S.C. 154(b) by 342 days.

(21) Appl. No.: 12/206,864

(22) Filed: Sep. 9, 2008

(65) Prior Publication Data
US 2009/0186635 A1    Jul. 23, 2009

(51) Int. Cl.
*G06Q 30/00* (2006.01)
(52) U.S. Cl. ............... 705/14.64; 705/14.49; 705/14.53; 705/14.67; 705/14.4; 705/14.5
(58) Field of Classification Search .................. None
See application file for complete search history.

(56) References Cited

U.S. PATENT DOCUMENTS

| | | | |
|---|---|---|---|
| 5,852,809 A * | 12/1998 | Abel et al. ................. | 705/26.44 |
| 5,950,123 A | 9/1999 | Schwelb et al. | |
| 5,995,590 A | 11/1999 | Brunet et al. | |
| 6,389,114 B1 | 5/2002 | Dowens et al. | |
| 6,421,707 B1 | 7/2002 | Miller et al. | |
| 6,456,616 B1 | 9/2002 | Rantanen | |
| 6,529,592 B1 | 3/2003 | Khan | |
| 6,603,837 B1 | 8/2003 | Kesanupalli et al. | |
| 6,684,249 B1 * | 1/2004 | Frerichs et al. ............... | 709/225 |
| 6,757,365 B1 | 6/2004 | Bogard | |
| 6,760,412 B1 | 7/2004 | Loucks | |
| 6,763,089 B2 | 7/2004 | Feigenbaum | |
| 6,790,704 B2 | 9/2004 | Doyle et al. | |
| 6,792,086 B1 | 9/2004 | Saylor et al. | |
| 6,801,604 B2 | 10/2004 | Maes et al. | |
| 6,816,578 B1 | 11/2004 | Kredo et al. | |
| 6,895,084 B1 | 5/2005 | Saylor et al. | |
| 6,907,112 B1 | 6/2005 | Guedalia et al. | |
| 6,931,255 B2 | 8/2005 | Mekuria | |
| 6,934,756 B2 | 8/2005 | Maes | |
| 7,065,185 B1 | 6/2006 | Koch | |
| 7,092,370 B2 | 8/2006 | Jiang et al. | |
| 7,095,733 B1 | 8/2006 | Yarlagadda et al. | |
| 7,113,803 B2 | 9/2006 | Dehlin | |
| 7,174,297 B2 | 2/2007 | Guerra et al. | |
| 7,184,786 B2 * | 2/2007 | Mumick et al. ............... | 455/466 |

(Continued)

FOREIGN PATENT DOCUMENTS

EP    0 946 032 A3    9/1999

(Continued)

OTHER PUBLICATIONS

Rossfrank, "Kostenlose Sprachmitteilung ins Festnetz", Dec. 10, 2000, 4 pages, Germany.

(Continued)

*Primary Examiner* — Gregory Johnson
(74) *Attorney, Agent, or Firm* — Toler Law Group, PC (57) ABSTRACT

A system of contextual advertising is disclosed. The system includes a message receiving module to receive a message from a sender and determine a recipient of the message. The system further includes an advertisement selection module to select an advertisement. The advertisement is selected based on at least one of a characteristic of the recipient, a characteristic of the sender, and a characteristic of the message. The system further includes a message delivery module to send the message to the recipient and an advertisement delivery module to send the advertisement to the sender.

38 Claims, 10 Drawing Sheets

U.S. PATENT DOCUMENTS

| | | | |
|---|---|---|---|
| 7,310,329 B2 | 12/2007 | Vieri et al. | |
| 7,664,516 B2 * | 2/2010 | Levi et al. | 455/466 |
| 7,865,394 B1 * | 1/2011 | Calloway et al. | 705/14.4 |
| 2002/0026356 A1 * | 2/2002 | Bergh et al. | 705/14 |
| 2002/0062245 A1 * | 5/2002 | Niu et al. | 705/14 |
| 2003/0028380 A1 | 2/2003 | Freeland et al. | |
| 2004/0054589 A1 * | 3/2004 | Nicholas et al. | 705/14 |
| 2004/0073482 A1 * | 4/2004 | Wiggins et al. | 705/14 |
| 2004/0186777 A1 | 9/2004 | Margiloff et al. | |
| 2004/0208302 A1 | 10/2004 | Urban et al. | |
| 2005/0033771 A1 | 2/2005 | Schmitter et al. | |
| 2005/0068939 A1 * | 3/2005 | Bangor et al. | 370/352 |
| 2005/0136949 A1 | 6/2005 | Barnes, Jr. | |
| 2005/0234779 A1 * | 10/2005 | Chiu et al. | 705/24 |
| 2006/0026067 A1 * | 2/2006 | Nicholas et al. | 705/14 |
| 2006/0047563 A1 * | 3/2006 | Wardell | 705/10 |
| 2006/0047568 A1 * | 3/2006 | Eisenberg et al. | 705/14 |
| 2006/0136298 A1 * | 6/2006 | Klein et al. | 705/14 |
| 2006/0248062 A1 * | 11/2006 | Libes et al. | 707/3 |
| 2006/0271442 A1 * | 11/2006 | Pfleging et al. | 705/26 |
| 2006/0276208 A1 * | 12/2006 | Jain | 455/466 |
| 2006/0281474 A1 * | 12/2006 | Domville et al. | 455/466 |
| 2007/0088801 A1 * | 4/2007 | Levkovitz et al. | 709/217 |
| 2007/0094330 A1 * | 4/2007 | Russell | 709/206 |
| 2007/0121846 A1 | 5/2007 | Altberg et al. | |
| 2007/0123280 A1 * | 5/2007 | McGary et al. | 455/466 |
| 2007/0130014 A1 * | 6/2007 | Altberg et al. | 705/14 |
| 2007/0162296 A1 | 7/2007 | Altberg et al. | |
| 2007/0239530 A1 * | 10/2007 | Datar et al. | 705/14 |
| 2007/0239737 A1 * | 10/2007 | Dudley et al. | 707/10 |
| 2007/0276729 A1 * | 11/2007 | Freer | 705/14 |
| 2008/0002892 A1 * | 1/2008 | Jelonek et al. | 382/224 |
| 2008/0004983 A1 * | 1/2008 | Cohn | 705/26 |
| 2008/0010355 A1 | 1/2008 | Vieri et al. | |
| 2008/0040227 A1 * | 2/2008 | Ostermann et al. | 705/14 |
| 2008/0046562 A1 * | 2/2008 | Butler | 709/224 |
| 2008/0147501 A1 * | 6/2008 | Gilliam | 705/14 |
| 2008/0221892 A1 * | 9/2008 | Nathan et al. | 704/257 |
| 2008/0221986 A1 * | 9/2008 | Soicher et al. | 705/14 |
| 2008/0222030 A1 * | 9/2008 | Fischler | 705/39 |
| 2008/0243619 A1 * | 10/2008 | Sharman et al. | 705/14 |
| 2008/0262846 A1 * | 10/2008 | Burns et al. | 704/260 |
| 2009/0150507 A1 * | 6/2009 | Davis et al. | 709/207 |
| 2009/0158136 A1 * | 6/2009 | Rossano et al. | 715/232 |
| 2010/0106599 A1 * | 4/2010 | Kohn et al. | 705/14.54 |

FOREIGN PATENT DOCUMENTS

| | | |
|---|---|---|
| JP | 2000134407 | 5/2000 |
| WO | 00/19697 A1 | 4/2000 |
| WO | 2005003920 A2 | 1/2005 |

OTHER PUBLICATIONS

U.S. Appl. No. 11/858,775, entitled "Mobile Device for Sending Text Messages", filed Sep. 20, 2007, by Vieri et al.

U.S. Appl. No. 12/018,889, entitled "System to Generate and Set Up an Advertising Campaign Based on the Insertion of Advertising Messages Within an Exchange of Messages, and Method to Operate Said System," filed Jan. 24, 2008, by Riccardo Vieri.

* cited by examiner

SYSTEMS AND METHODS OF CONTEXTUAL ADVERTISING

CLAIM OF PRIORITY

This application claims priority from Italian Patent Application No. PO2008A000002, filed on Jan. 22, 2008, which is incorporated herein by reference in its entirety.

FIELD OF THE DISCLOSURE

The present disclosure is generally related to systems and methods of contextual advertising.

BACKGROUND

The advertising world today is experiencing rapid changes. Performance of regular banner advertising and email marketing is declining, and companies are attracted by innovative forms of advertising, such as pay per performance advertising.

Short Message Service (SMS) messages have become an important communication method. It is estimated that every year people in Italy alone send more than 20 billion SMS messages, roughly equal to 80 million SMS messages a day. SMS messages may be sent via the Internet at reduced costs compared to SMS messages sent through cellular telecommunications networks. For example, in Italy, of the 80 million SMS messages sent daily, roughly 20% are sent via the Internet. Sending SMS messages via the Internet is becoming increasingly common.

DETAILED DESCRIPTION OF THE DRAWINGS

The present disclosure describes a system and method of contextual advertising, where an advertisement is selected based on one or more of a characteristic of a recipient, a characteristic of a sender, and a characteristic of a message.

In a particular embodiment, a system includes a message receiving module. The message receiving module receives a message, such as a short message service (SMS) message, from a sender and determines a recipient of the message. The system further includes an advertisement selection module to select an advertisement. The advertisement is selected based on at least one of a characteristic of the recipient, a characteristic of the sender, and a characteristic of the message. The system further includes a message delivery module to send the message to the recipient and an advertisement delivery module to send the advertisement to the sender.

In a particular embodiment, a method includes receiving a short message service (SMS) message at a server. The method further includes determining a recipient of the SMS message. The method further includes identifying data associated with an advertisement campaign. The data includes at least one of a characteristic of the recipient, a characteristic of the sender, and a characteristic of the message. The method further includes generating an advertisement based on the identified data and based on at least a portion of the SMS message. The method further includes sending the advertisement from the server to a sender of the SMS message and sending the SMS message from the server to the recipient.

In a particular embodiment, a computer-readable medium includes computer-executable instructions. When executed by a processor, the computer-executable instructions cause the processor to receive an SMS message at a server. The computer-executable instructions further cause the processor to determine a recipient of the SMS message. The computer-executable instructions further cause the processor to identify data associated with an advertisement campaign. The computer-executable instructions further cause the processor to generate an advertisement based on the identified data and based on at least a portion of the SMS message. The advertisement includes an audio portion generated by a text-to-speech (TTS) module. The computer-executable instructions further cause the processor to send the advertisement from the server to a sender of the SMS message and to send the SMS message from the server to the recipient.

In a particular embodiment, a device is disclosed that includes a graphical user interface module adapted to receive SMS message data via a first graphical user interface. The SMS message data is associated with a text message from a user. The graphical user interface module is adapted to receive recipient data via the first graphical user interface. The recipient data is associated with one or more recipients of the text message. The graphical user interface module is further adapted to present a video advertisement, where the video advertisement is associated with the text message. The device further includes an audio module adapted to present an audio advertisement, where the audio advertisement is associated with the text message. The device further includes a message delivery module adapted to send the text message via a server.

In a particular embodiment, a user interface is adapted to transmit an SMS message and to receive an associated advertisement. The user interface includes an area to receive a destination telephone number. The user interface further includes an area to receive information to be sent by the SMS message. The user interface further includes an area to receive Completely Automated Public Turing test to tell Computers and Humans Apart (CAPTCHA) characters. CAPTCHA characters may prevent abuse or automatic unauthorized sending of SMS messages. The user interface further includes an area to receive the associated advertisement.

Figure 1:
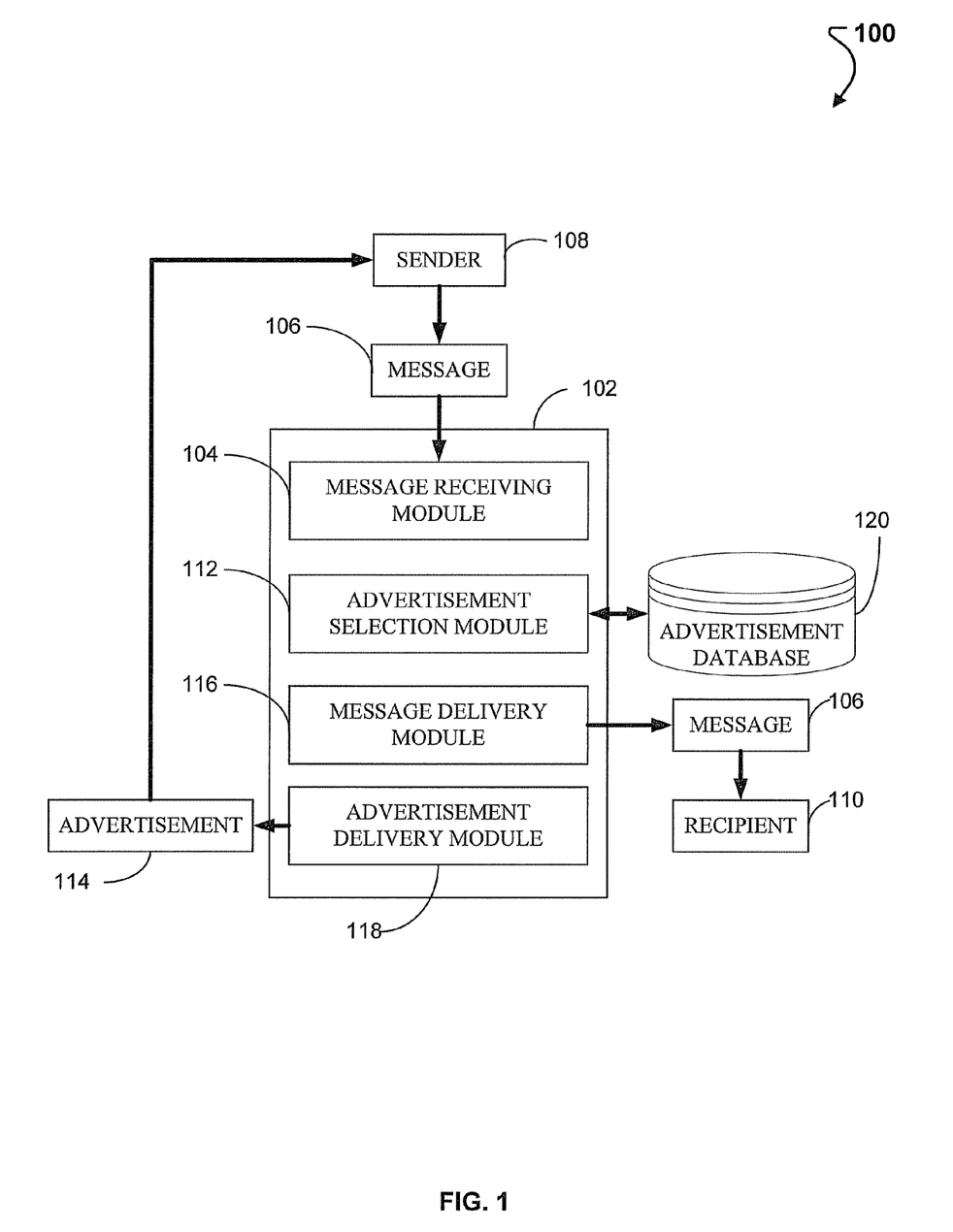
FIG. 1 is a block diagram of an embodiment of a system of contextual advertising.

Referring to FIG. 1, a block diagram of an embodiment of a system of contextual advertising is illustrated, at 100. A computer system 102 includes a message receiving module 104 to receive a message 106 from a sender 108 and to determine a recipient 110 of the message 106. The computer system 102 further includes an advertisement selection module 112 to select an advertisement 114, a message delivery module 16 to send the message 106 to the recipient 110, and an advertisement delivery module 118 to send the advertisement 114 to the sender 108.

The computer system 102 receives the message 106 sent from an electronic device of the sender 108. The message 106 may be received from a variety of types of electronic devices. For example, the message 106 may be received from a voice-over-internet-protocol (VoIP) telephone. In a particular embodiment, the VoIP telephone may be a videophone capable of receiving video advertisements. Alternatively, the message 106 may be received from a mobile electronic device, such as cell phone or a personal digital assistant (PDA). In one embodiment, the message 106 is received from the sender 108 via a web application or an instant messaging application running on the electronic device.

In one embodiment, the computer system 102 is a server computer. The computer system 102 can include a set of instructions that can be executed to cause the computer system 102 to perform any one or more of the methods or computer based functions described herein. The computer system 102 can also be implemented as any other machine capable of executing a set of instructions (sequential or otherwise) that specify actions to be taken by that machine. Further, while a single computer system 102 is illustrated, the term "system" includes any collection of systems or sub-systems that individually or jointly execute a set, or multiple sets, of instructions to perform one or more computer functions. The computer system 102 may include a processor, e.g., a central processing unit (CPU), a graphics processing unit (GPU), or both. Moreover, the computer system 102 may include a main memory and a static memory that can communicate with each other via a bus.

The computer system 102 may include a computer-readable medium in which one or more sets of instructions (e.g., software) can be embedded. Further, the instructions may embody one or more of the methods or logic described herein. In a particular embodiment, the instructions may reside completely, or at least partially, within the main memory, the static memory, and/or within the processor during execution by the computer system 102. The main memory and the processor also may include computer-readable media.

In an alternative embodiment, dedicated hardware implementations, such as application specific integrated circuits, programmable logic arrays and other hardware devices, can be constructed to implement one or more of the methods described herein. Accordingly, the present computer system 102 encompasses software, firmware, and hardware implementations.

Referring to FIG. 1, upon receiving the message 106 from the sender 108, the message receiving module 104 of the computer system 102 determines a recipient 110 of the message 106. In a particular illustrative embodiment, the message receiving module 104 is adapted to communicate via one or more of a short message service (SMS) network, an Internet Protocol (IP) network, a public switched telephone network (PSTN), or a multimedia messaging service (MMS) network, among other alternatives.

The computer system 102 includes an advertisement selection module 112 to select an advertisement 114. In the embodiment shown in FIG. 1, the advertisement selection module 112 selects the advertisement 114 from an advertisement database 120. The advertisement 114 is selected based on at least one of a characteristic of the recipient 110, a characteristic of the sender 108, and a characteristic of the message 106. In the event that there is no match based on one or more of these characteristics, a generic advertisement may be selected. Alternatively, a generic advertisement may be selected that is independent of these characteristics, regardless of whether there are any matches based on the characteristics. Such a generic advertisement may allow an advertiser to reduce advertising expenses compared to advertisements targeted based on particular characteristics (i.e., target demographics, target context). In the embodiment shown in FIG. 1, the advertisement database 120 is shown as separate from the computer system 102. Alternatively, the advertisement database 120 may be stored at the computer system 102.

In one embodiment, the at least one characteristic of the message 106 includes at least one of text data, audio data, and video data. For example, the at least one characteristic of the message may include one or more of an Internet Protocol (IP) location, a time zone, or a connection type, among other alternatives. In one embodiment, the characteristic of the message 106 includes one or more symbols used in instant messaging systems (e.g. emoticons).

In one embodiment, the at least one characteristic of the sender 108 is determined based on information received from a service provider or information received from a sender device. For example, the at least one characteristic of the sender 108 may include one or more of a phone number, a city, a name, a location, an interest, a time zone, a climatic condition associated with the location, a type of network connection, a gender, a content of a visited website, or a social class of the sender 108, among other alternatives.

In one embodiment, the at least one characteristic of the recipient 110 is determined based on information received from a service provider or information received from a recipient device. In a particular illustrative embodiment, the at least one characteristic of the recipient 110 may include one or more of a phone number, a city, a name, a location, an interest, a time zone, a climatic condition associated with the location, a type of network connection, a gender, a content of a visited website, or a social class of the recipient 110, among other alternatives.

In one illustrative embodiment, the advertisement selection module 112 selects a pre-recorded advertisement 114 from the advertisement database 120. In another illustrative embodiment, the advertisement selection module 112 selects the advertisement 114 according to a template, where the template is populated with data including at least one of text data, audio data, and video data provided by an advertiser. For example, the template may include one or more avatars, where each of the one or more avatars includes a graphical representation of a character that is adapted to present the advertisement 114 to the sender 108. In one embodiment, the avatar may be a male character for delivering audio advertisements using a male voice. In another embodiment, the avatar may be a female character for delivering audio advertisements using a female voice. Alternative embodiments may include avatars representing different age groups, ethnic groups, among other alternatives. For example, a cartoon character may be used to deliver advertisements to younger age groups, while a human avatar may be used to deliver advertisements to older age groups.

In another illustrative embodiment, the advertisement selection module 112 selects the advertisement 114 based on a number of messages sent by the sender 108. In one embodiment, the number of messages sent by the sender 108 may be stored at the advertisement database 120. For example, the advertisement selection module 112 may select a first advertisement from the advertisement database 120 by comparing the total number of messages sent by the sender 108 to a first threshold number of messages. The first threshold number of messages may be used to classify senders 108 as infrequent or frequent senders of messages. For example, if the sender 108 has not yet sent a message over the computer system 102, the number of messages sent by the sender 108 would be zero. In this case, the advertisement selection module 112 may select a first advertisement. Alternatively, the number of messages previously sent by the sender 108 may exceed the first threshold number of messages. In this case, the advertisement selection module 112 may select a second advertisement. Similarly, the advertisement selection module 112 may select a third advertisement from the advertisement database 120 when the number of messages previously sent by the sender exceeds a second threshold number of messages. Thus, advertisements received by infrequent senders of messages may differ from advertisements received by frequent senders of messages. In alternative embodiments, the advertisement selection module 112 may select an advertisement based on one or more frequency thresholds, where the thresholds represent the total number of messages previously sent by the sender 108, the number of messages previously sent to one or more recipients 110, or the number or messages sent during a predetermined time window, among other alternatives.

In another illustrative embodiment, the advertisement selection module 112 selects the advertisement 114 based on a number of website visits by the sender 108. For example, the websites visited may include user interfaces where senders 108 may send SMS messages 106 to recipients 110. In one embodiment, the number of website visits by the sender 108 may be stored at the advertisement database 120. For example, the advertisement selection module 112 may select a first advertisement from the advertisement database 120 by comparing the total number of website visits by the sender 108 to a first threshold number of website visits. The first threshold number of website visits may be used to classify senders as infrequent or frequent website visitors. For example, if the sender 108 has not yet visited a website, the number of website visits by the sender 108 would be zero. In this case, the advertisement selection module 112 may select a first advertisement. Alternatively, the number of previous website visits by the sender 108 may exceed the first threshold number of website visits. In this case, the advertisement selection module 112 may select a second advertisement. Similarly, the advertisement selection module 112 may select a third advertisement from the advertisement database 120 when the number of previous website visits by the sender exceeds a second threshold number of website visits. Thus, advertisements received by infrequent website visitors may differ from advertisements received by frequent website visitors. In alternative embodiments, the advertisement selection module 112 may select an advertisement based on one or more frequency thresholds, where the thresholds represent the total number of website visits, or the number of website visits to one or more websites, the number or website visits during a predetermined time window, among other alternatives.

Upon selection of the advertisement by the advertisement selection module 112, the advertisement delivery module 118 sends the advertisement 114 to the sender 108. The message delivery module 116 sends the message 106 to the recipient 110. In a particular embodiment, the advertisement 114 and the message 106 are sent at substantially the same time. In an alternative embodiment, the advertisement 114 is sent to the sender 108 after the message 106 is sent to the recipient 110. In another alternative embodiment, the advertisement 114 is sent to the sender 108 after the computer system 102 receives a delivery confirmation message 106 from the recipient 110, confirming delivery of the message 106 to the recipient 110. Optionally, the message delivery module 116 may also deliver a recipient advertisement to the recipient 110. For example, the message 106 delivered to the recipient may contain the recipient advertisement selected from the advertisement database 120. In one embodiment, the advertisement 114 may be delivered to a VoIP telephone, allowing delivery of advertisements without a user clicking on a link or otherwise interacting via a mouse, as in traditional web-based contextual advertising. Alternatively, the advertisement 114 may be delivered to a television or any other display device.

Figure 2:
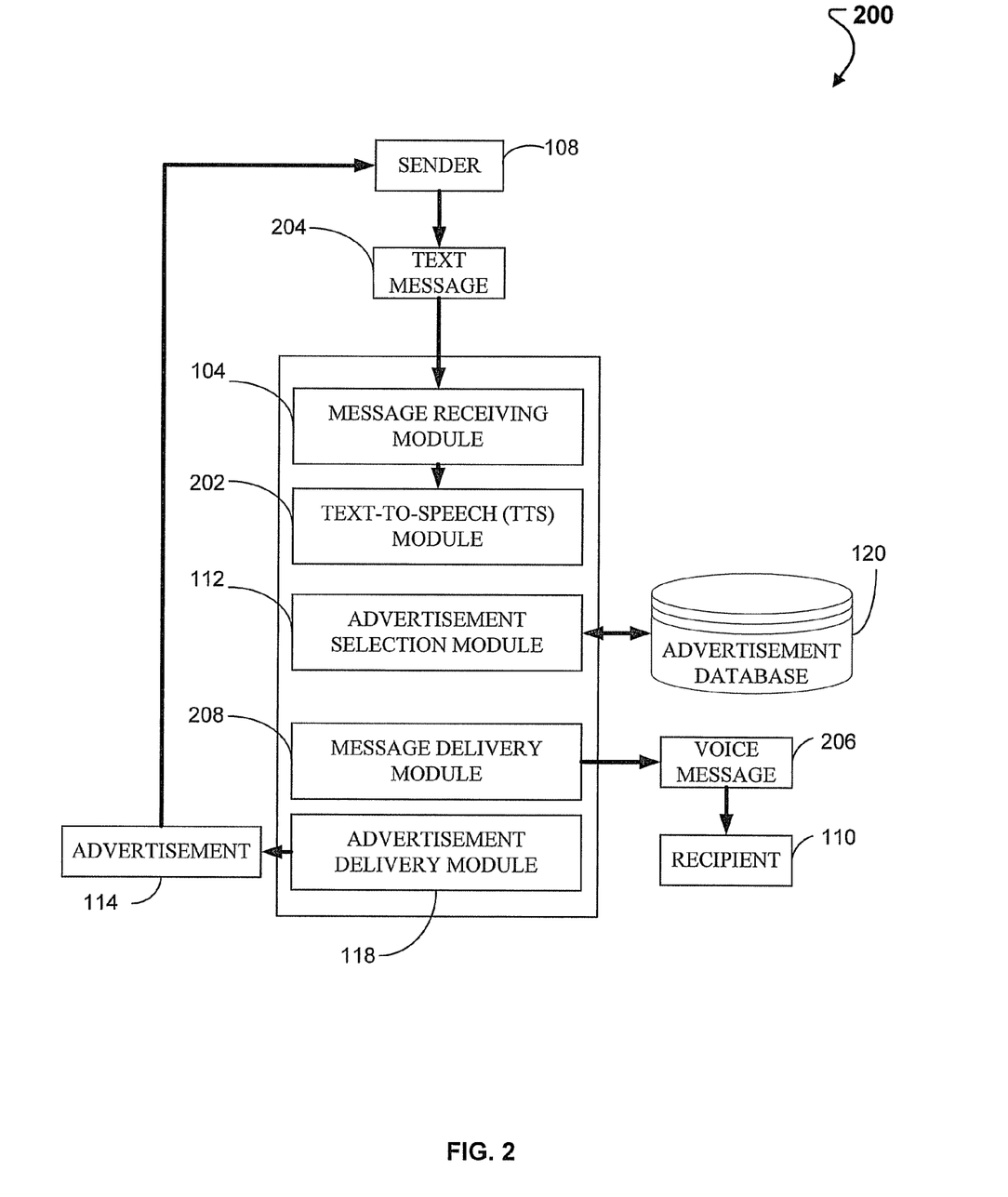
FIG. 2 is a block diagram of a particular illustrative embodiment of a system of contextual advertising including a text-to-speech (TTS) module.

Referring to FIG. 2, a block diagram of an illustrative embodiment of a system including a text-to-speech (TTS) module 202 is illustrated, at 200. The TTS module 202 is responsive to the message receiving module 104 and receives a text message 204 from the sender 108. The TTS module 202 is adapted to convert the text message 204 to a voice message 206. The message delivery module 208 is adapted to deliver the voice message 206 to the recipient 110. Conversion of the original text message 204 into the voice message 206 enables delivery of SMS message information to a recipient device that is unable to receive text data (i.e., land line phones). In a particular embodiment, the TTS module 202 identifies a language associated with the text message 204 and generates the voice message 206 based on the identified language. In one embodiment, the identified language is one of a plurality of languages, and the TTS module 202 uses a distinct voice to generate speech for each of the plurality of languages.

In a particular embodiment, an SMS message is received from a sender via a user interface of a web page. For example, an SMS text message 204 may be generated by the sender 108 at the user interface of the web page and sent to the message receiving module 104. In an illustrative embodiment, the SMS message 204 is parsed to determine if the SMS message 204 includes text that matches one or more key words displayed on the web page. The advertisement selection module 112 may then select an advertisement 114 from the advertisement database 120 based on this determination. In one embodiment, the one or more key words are stored at the advertisement database 120. The advertisement delivery module 118 may then send the advertisement 114 to the sender 108. In a particular illustrative embodiment, the web page is adapted to display the advertisement 114 upon the sender 108 mousing over one or more of the key words. Alternatively, the web page may be adapted to display the advertisement 114 based upon other sender actions with respect to the web page.

Because the SMS message may be received from the sender via the user interface of a web page, any web site operator may provide the ability for visitors to send SMS messages. In one embodiment, a web site may offer free or reduced cost SMS messages. This may allow the web site to attract more visitors and increase advertising revenue. In an alternative embodiment, an SMS message contact form may be provided on a web site. The SMS message contact form may allow an advertiser to receive requests from interested parties without the need for potentially expensive toll-free phone numbers, employees, or other expenses. Further, the advertiser may screen potential customers based on targeted questions, leading to more accurate lead generation.

Figure 3:
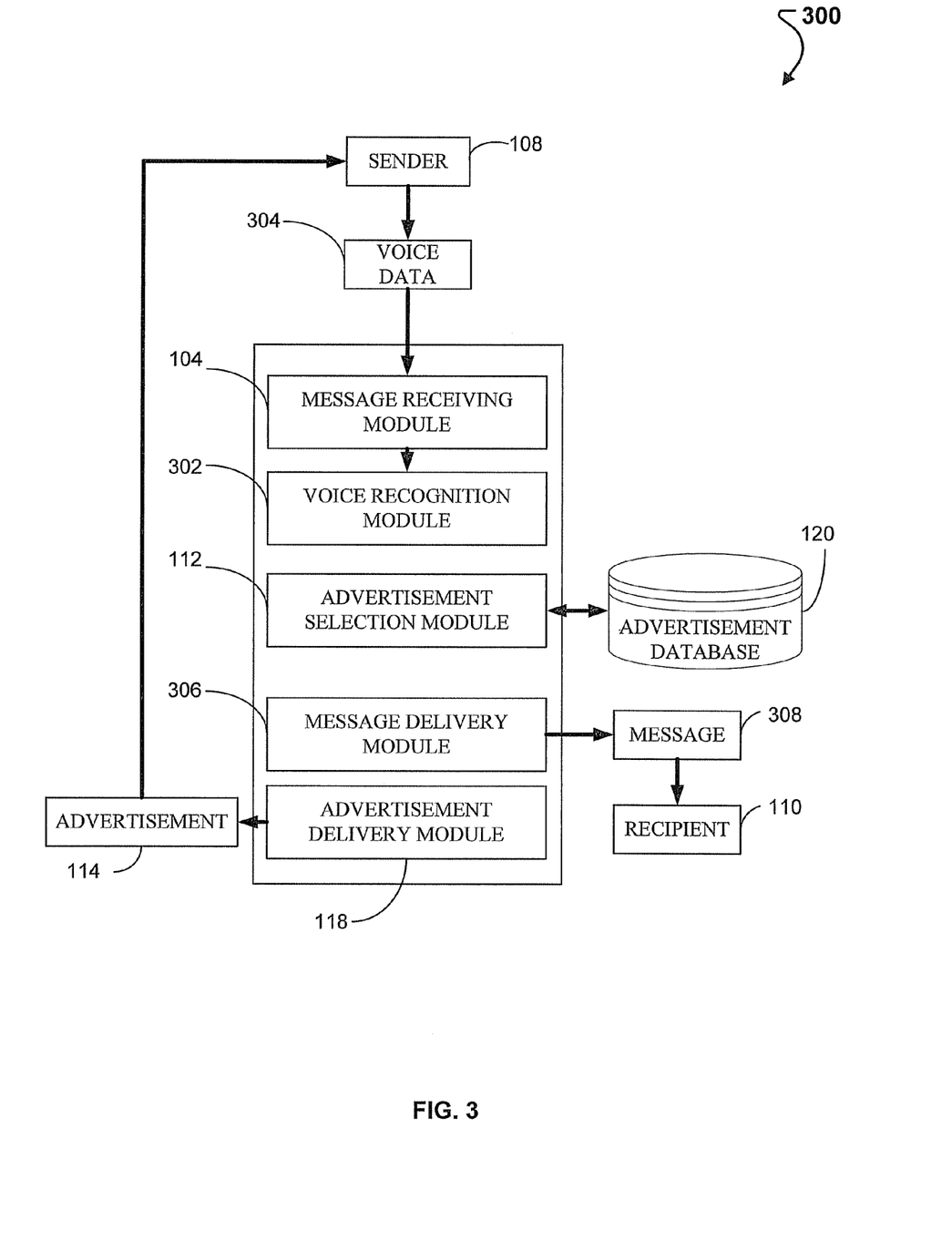
FIG. 3 is a block diagram of a particular illustrative embodiment of a system of contextual advertising including a voice recognition module.

Referring to FIG. 3, a block diagram of an alternative illustrative embodiment of a system including a voice recognition module 302 is illustrated, at 300. The voice recognition module 302 is responsive to the message receiving module 104 and receives voice data 304 from the sender 108. The voice recognition module 302 is adapted to convert the voice data 304 into text data for use by the advertisement selection module 112. The message delivery module 306 may deliver a message 308 to the recipient 110 as either voice data 304 or text data.

Figure 4:
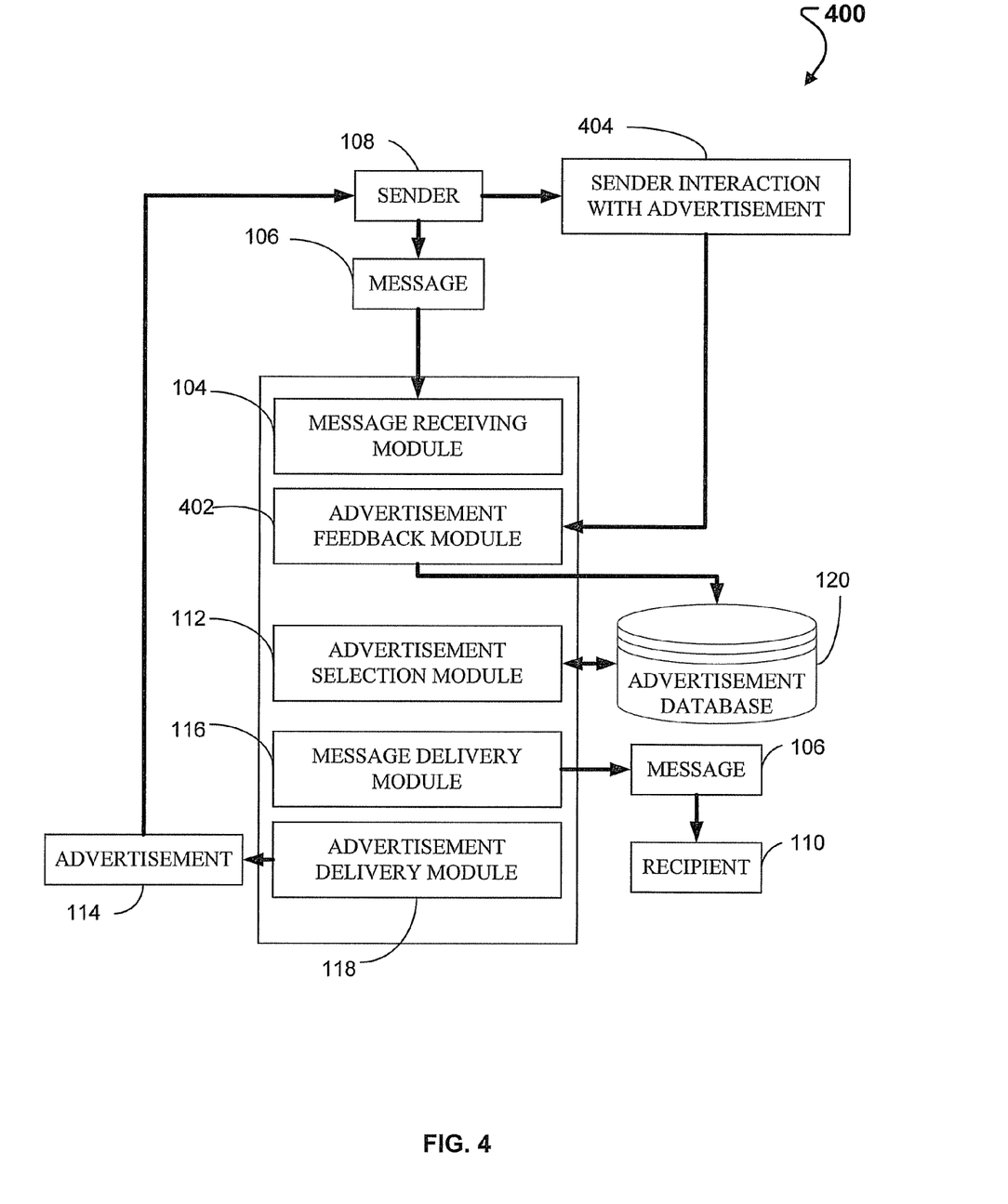
FIG. 4 is a block diagram of another illustrative embodiment of a system of contextual advertising.

Referring to FIG. 4, a block diagram of another illustrative embodiment of a system of contextual advertising is illustrated, at 400. The illustrative embodiment shown in FIG. 4 includes an advertisement feedback module 402 to receive feedback information 404 related to interaction of the sender 108 with the advertisement 114. In a particular embodiment, the feedback information 404 may be provided to an advertiser in substantially real-time, which may allow for more effective advertising planning. Such feedback information 404 may contain information such as hits, location clicks, or other specific information about the sender reaction to the advertisement 114. This may allow an advertising campaign to be planned to target a very selective audience. In a particular illustrative example, a targeted advertising campaign may be used to target men between 35 and 40 years of age, located in a particular city (e.g., Florence), that are chatting about sports cars and that are interested in car racing sports. In a particular embodiment, the more selective the target, the more expensive the advertising fees.

In a particular illustrative embodiment, credits may be assigned based upon certain actions. For example, credits may be assigned based on the sender 108 sending one or more SMS messages, sending advertisements, or interacting with advertisements, among other alternatives. For example, the advertisement database 120 may store information related to the total number of SMS messages sent by the sender 108. Further, the advertisement database 120 may store information 404 received from the advertisement feedback module 402 related to sender 108 interaction with one or more advertisements 114. The total number of SMS messages sent by the sender 108 may be compared to a first threshold number of SMS messages. The first threshold number of SMS messages may be used to classify senders as infrequent or frequent SMS message senders. Thus, frequent senders of SMS messages may receive more credits than infrequent senders of SMS messages. The credits may represent money or benefits, among other alternatives. Credits may encourage increased usage of the system by senders interested in obtaining credits for such activity. In one illustrative embodiment, senders classified as frequent SMS senders may receive credits in the form of free SMS messages. In another illustrative embodiment, senders may receive credits in the form of reduced fee SMS messages.

In one embodiment, a sender may be added to an autoresponder cycle, resulting in the presentation of a sequence of other advertisements to the sender 108. For example, upon receiving a first message 106 from a particular type of sender 108, the advertisement selection module 112 may select a first advertisement from a predetermined sequence of advertisements stored at the advertisement database 120. Upon receiving a second message 106 from a particular type of sender 108, the advertisement selection module 112 may select a second advertisement from the predetermined sequence of advertisements stored at the advertisement database 120. Presentation of advertisements in a predetermined sequence may be useful to advertisers seeking to target a particular type of sender. For example, a particular type of sender may be a man between 35 and 40 years of age, located in a particular city (e.g., Florence). Advertisers may seek to target this particular type of sender with a first advertisement related to new car sales, then a second advertisement related to car repair services. The predetermined sequence of advertisements in the autoresponder cycle may vary based on one or more factors. As noted above, the advertisement feedback module 402 may provide input useful to an advertiser seeking to adjust this sequence to more effectively target the particular type of sender.

Figure 5:
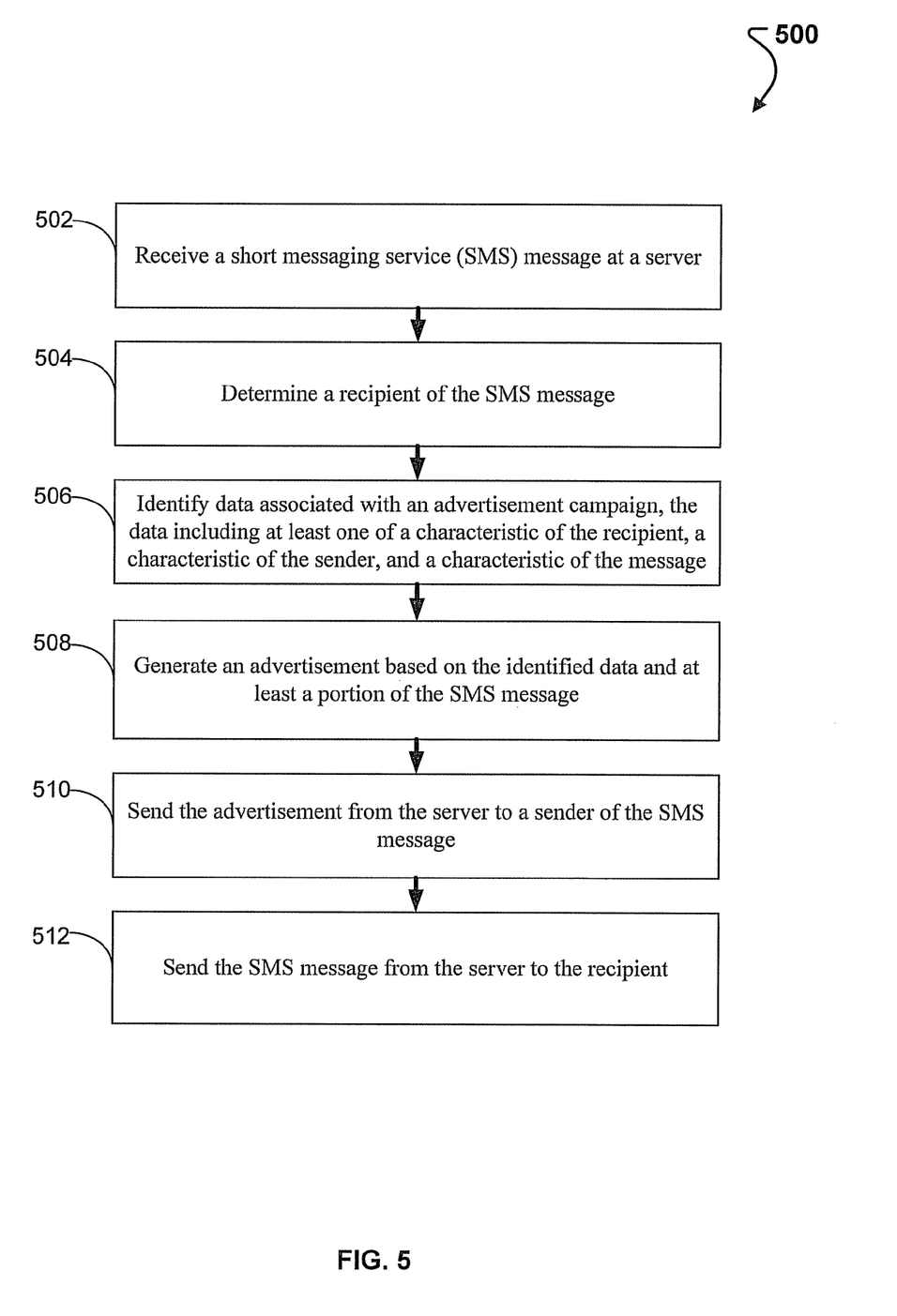
FIG. 5 is a flow chart of an embodiment of a method of contextual advertising.

Referring to FIG. 5, a particular embodiment of a method of contextual advertising is illustrated, at 500. The method includes, at 502, receiving a short messaging service (SMS) message at a server. The format of the SMS message may be one of an executable file, an Adobe Flash™ file, a Microsoft PowerPoint™ file, a Portable Document Format (PDF) file, a text file or other format that allows the SMS message to be sent over an Internet Protocol (IP) network. In one illustrative embodiment, the method may further include converting the SMS message to a voice message using a text-to-speech (TTS) module for subsequent delivery as a voice message to a message recipient.

The method further includes determining a recipient of the SMS message, at 504. The method includes identifying data associated with an advertisement campaign, at 506. The identified data includes at least one of a characteristic of the recipient, a characteristic of the sender, and a characteristic of the message.

The method further includes, at 508, generating an advertisement based on the identified data and based on at least a portion of the SMS message. In one embodiment, the advertisement comprises at least an audio portion. In an alternative embodiment, the advertisement further includes at least one of a video portion and a text portion. In one illustrative embodiment, the audio portion is generated by a TTS module. In a particular embodiment, the TTS module identifies a language associated with the SMS message and generates the audio portion based on the identified language. In one embodiment, the identified language is one of a plurality of languages, and the TTS module uses a distinct voice to generate speech for each of the plurality of languages.

At 510, the method further includes sending the advertisement from the server to a sender of the SMS message. In one embodiment, the advertisement is sent from the server to the sender of the SMS message after the sender performs an action. For example, the advertisement may be sent after the sender performs a mouse movement. In one embodiment, monitoring the mouse movement of the sender may make it possible to predict the intentions of the sender. For example, if the mouse movement of the sender indicates that the sender may be about to leave the page (e.g., mouse movement near the top corner of a window), an additional advertisement may be displayed. As a further example, the advertisement may be sent after the sender presses a button on a cell phone.

The method further includes sending the SMS message from the server to the recipient, at 512. In one embodiment, sending the advertisement from the server to the sender, shown at 510, and sending the SMS message to the recipient, shown at 512, occur at substantially the same time. In an alternative embodiment, sending the advertisement from the server to the sender, shown at 510, occurs after sending the SMS message to the recipient, shown at 512. In another alternative embodiment, sending the advertisement from the server to the sender, shown at 510, occurs after receiving a delivery confirmation message confirming delivery of the SMS message to the recipient, shown at 512.

Figure 6:
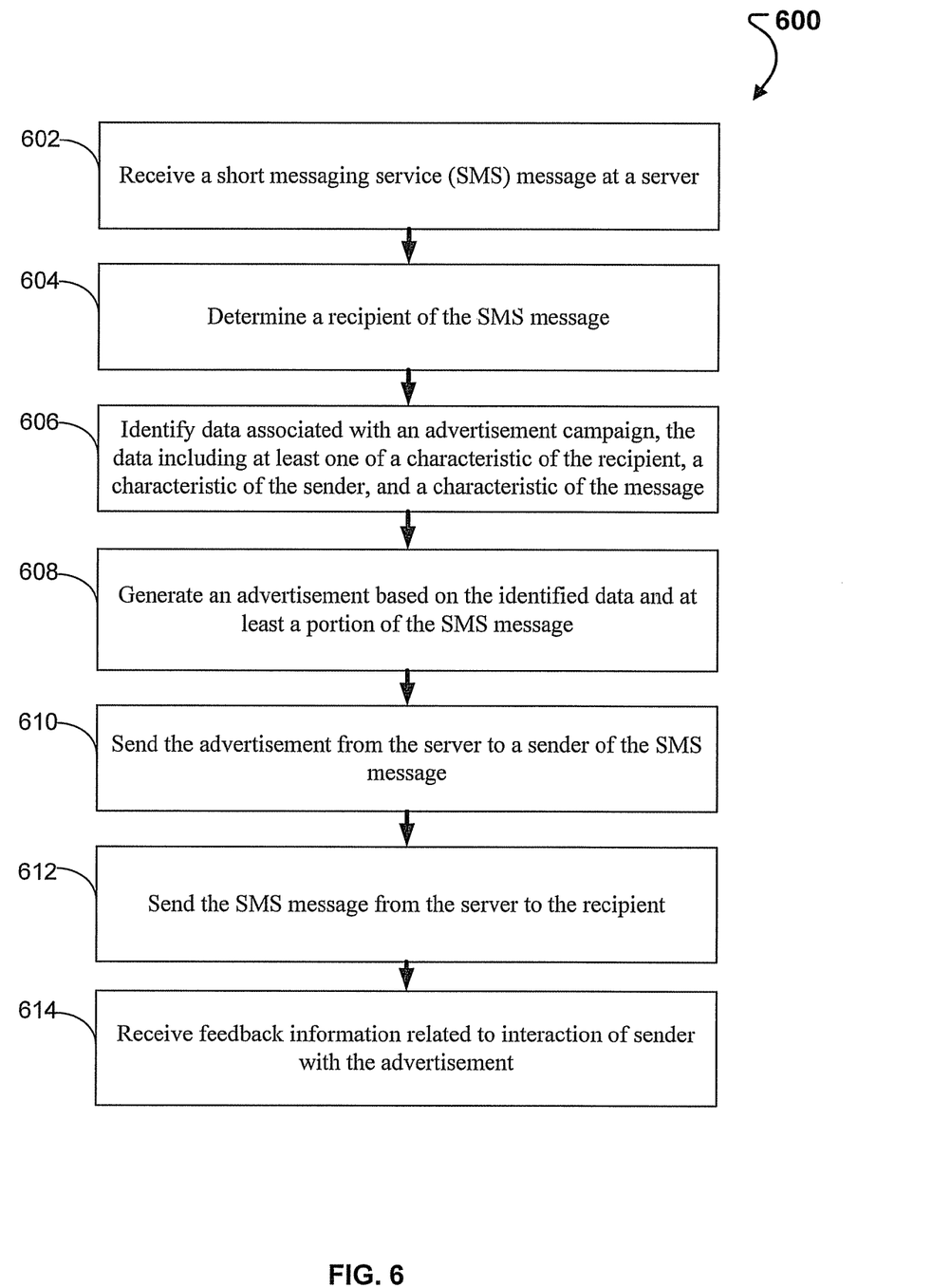
FIG. 6 is a flow chart of an embodiment of a method of contextual advertising including a feedback mechanism based on sender interaction with advertisements.

Referring to FIG. 6, another particular embodiment of a method of contextual advertising is shown, at 600. Steps 602 to 612, shown in FIG. 6, correspond to steps 502 to 512, shown in FIG. 5. In step 614, the method further includes receiving feedback information related to interaction of the sender with the advertisement. As noted above, such feedback information may provide valuable information to advertisers and may enable more effective targeted advertising campaigns.

Figure 9:
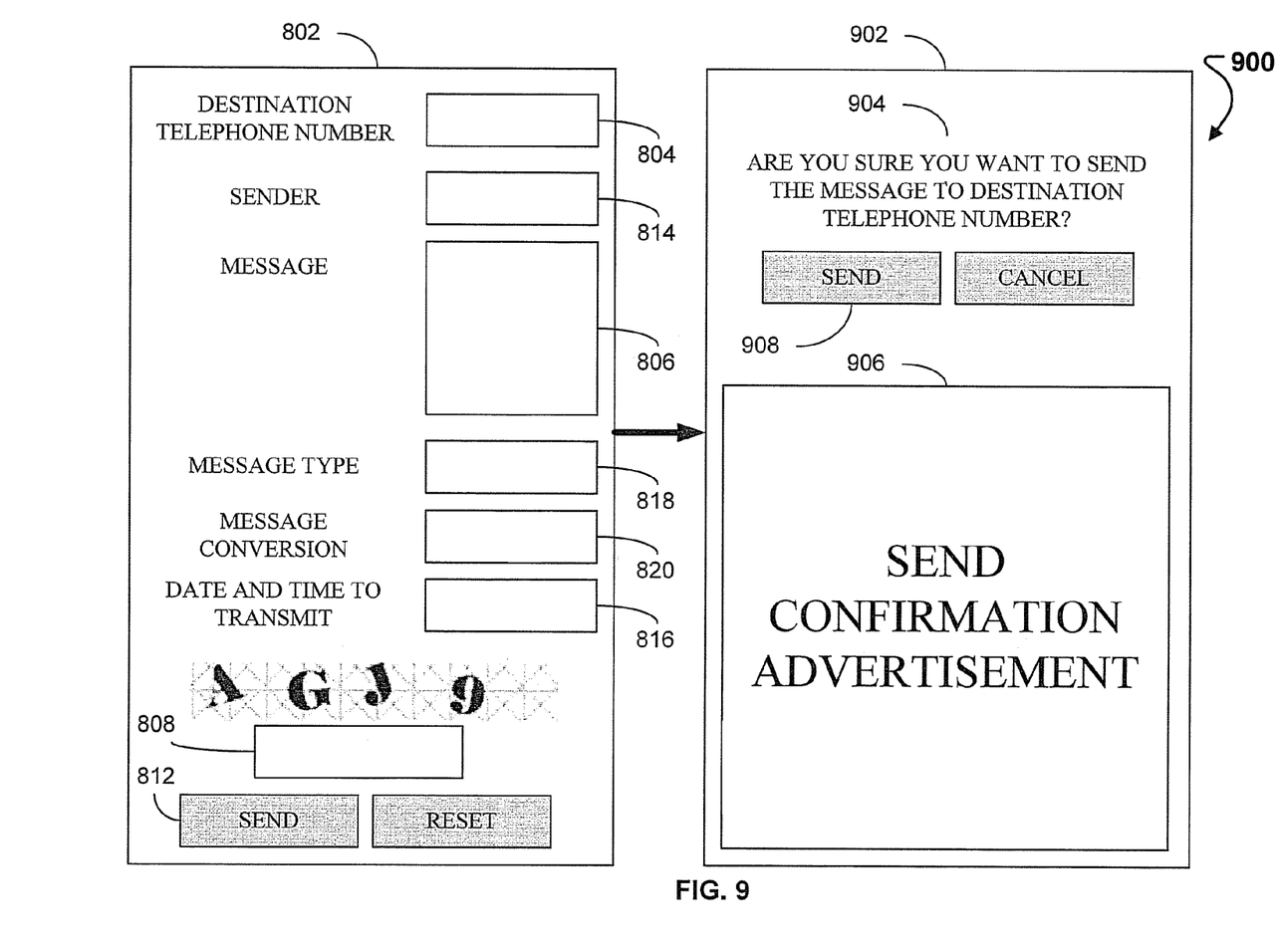
FIG. 9 is an illustrative embodiment of a user interface adapted to receive an SMS message from a sender and to display a send confirmation advertisement along with a send confirmation query.
Figure 10:
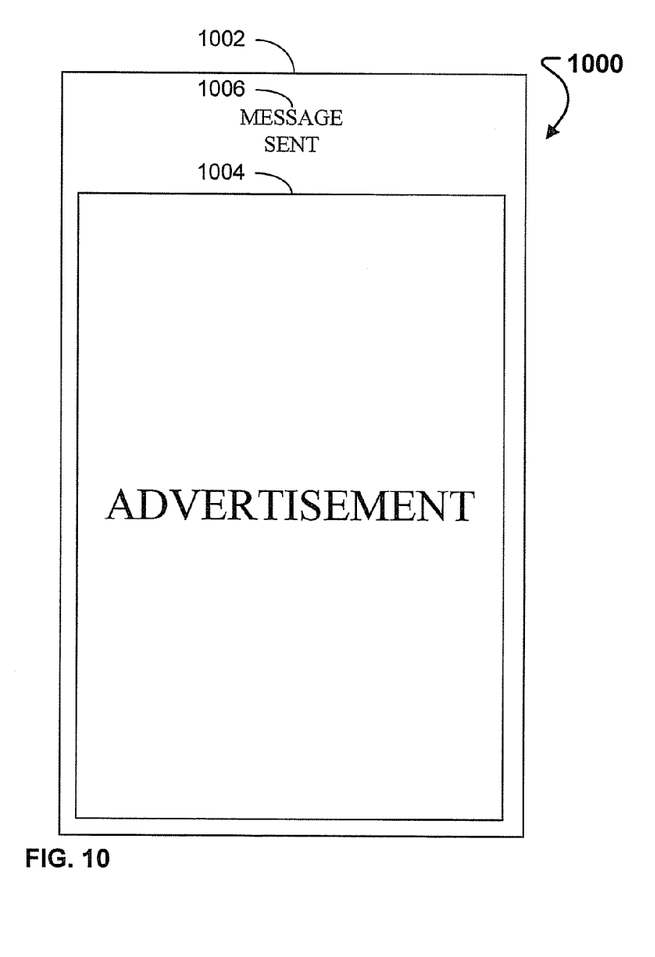
FIG. 10 shows the user interface with the send confirmation advertisement as shown in FIG. 9 along with a subsequent advertisement displayed to the sender upon the sender confirming that the SMS message is to be sent.

In a particular embodiment, the method further includes generating a send confirmation query and an associated send confirmation advertisement, upon receiving the SMS message at the server. Further, the method includes sending the send confirmation query and the associated send confirmation advertisement from the server to the sender. An embodiment of a user interface including the send confirmation query and an associated send confirmation advertisement is illustrated at FIG. 9, described below. In a particular embodiment, the send confirmation advertisement may be a generic advertisement displayed to any sender (e.g., a non-targeted advertisement). Upon receiving an affirmative response from the sender to the send confirmation query, the method further includes sending the advertisement from the server to the sender and sending the SMS message from the server to the recipient. An embodiment of the user interface operable to display the advertisement upon the sender confirming that the message is to be sent is illustrated at FIG. 10, described below. In a particular embodiment, the advertisement displayed upon the sender confirming that the message is to be sent is a targeted advertisement (i.e., an advertisement selected or generated based on a characteristic of the sender, recipient, or message, or any combination thereof, as described above).

Figure 7:
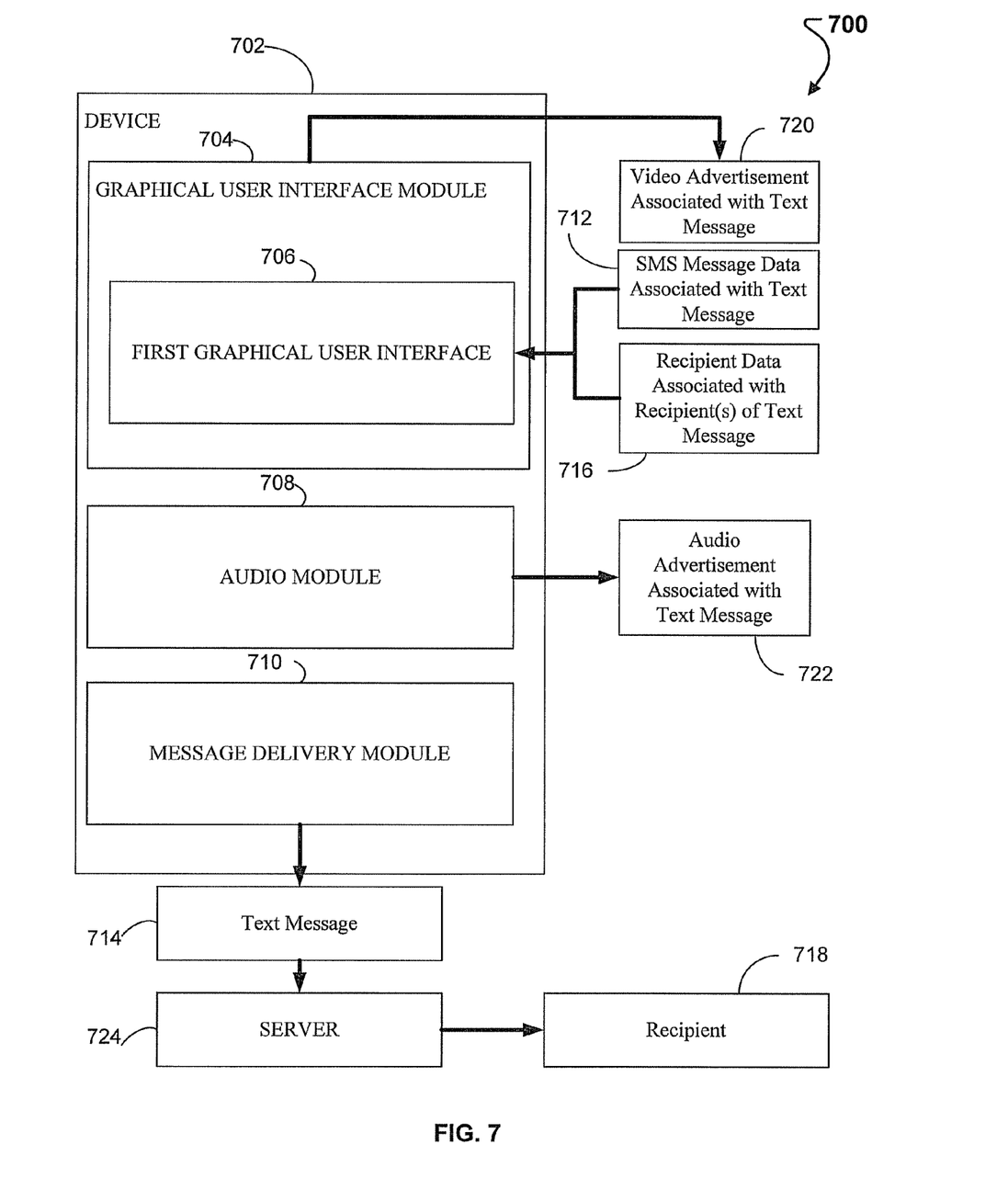
FIG. 7 is a block diagram of an embodiment of a device adapted to receive short message service (SMS) message data and to display an advertisement.

Referring to FIG. 7, an embodiment of a device 702 is illustrated, at 700. In an illustrative embodiment, the device 702 may be an electronic device used by a sender to send a message to a computer system (such as the computer system 102 shown in FIG. 1). In the embodiment shown in FIG. 7, the device 702 includes a graphical user interface module 704, a first graphical user interface 706, an audio module 708, and a message delivery module 710.

The graphical user interface module 704 is adapted to receive SMS message data 712 via the first graphical user interface 706. The SMS message data 712 is associated with a text message 714. The graphical user interface module 704 is further adapted to receive recipient data 716 via the first graphical user interface 706. The recipient data 716 is associated with one or more recipients 718 of the text message 714. The graphical user interface module 704 is further adapted to present a video advertisement 720 associated with the text message 714. The audio module 708 is adapted to present an audio advertisement 722 associated with the text message 714. The message delivery module 710 is adapted to send the text message 714 via a server 724 to the recipient 718. In one embodiment, the audio module 708 is adapted to present the audio advertisement 722 without prior installation of a text-to-speech (TTS) module at the device 702. The TTS module may require substantial processor and/or memory resources. For this reason, the TTS module may be stored at the server 724. Storing the TTS module at the server 724 may thus enable the device 702 to be a portable device with reduced processor and/or memory resource requirements (e.g., a cell phone or PDA). In one embodiment, the first graphical user interface 706 is operable to receive SMS message data 712 via a touch screen display. In another embodiment, the first graphical user interface 706 is operable to receive SMS message data 712 via a browser.

In one embodiment, the graphical user interface module 704, the audio module 708, and the message delivery module 710 are distributable via a downloadable software package. Thus, existing electronic devices with the ability to present audio and video advertisements and the ability to receive SMS message data via an input device may download the modules 704, 708, and 710 to enable the functions described herein without any additional hardware installation required.

Figure 8:
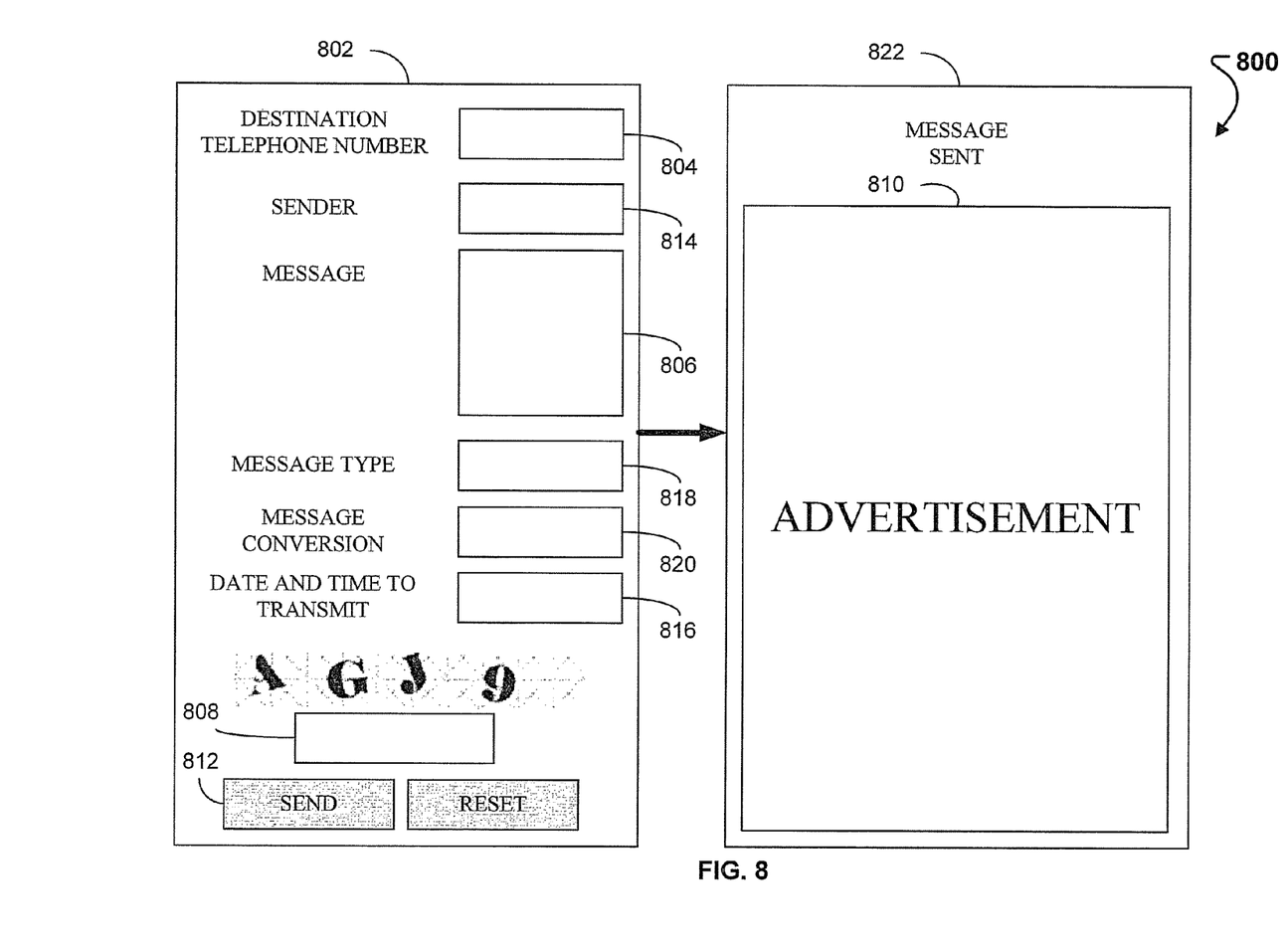
FIG. 8 is an illustrative embodiment of a user interface adapted to receive an SMS message from a sender and to display an advertisement to the sender.

Referring to FIG. 8, an embodiment of a user interface 802 adapted to transmit an SMS message and to receive an associated advertisement is illustrated, at 800. In an illustrative embodiment, the user interface 802 may be the user interface of an electronic device (e.g., the first graphical user interface 706 of device 702 shown in FIG. 7) used by a sender to send a message to a server (e.g., the computer system 102 shown in FIG. 1). The user interface 802 includes an area to receive a destination telephone number 804, an area to receive information to be sent by the SMS message 806, an area to receive Completely Automated Public Turing test to tell Computers and Humans Apart (CAPTCHA) characters 808, and an area to receive the associated advertisement 810 upon the sender selecting the send button 812.

Various embodiments of the user interface 802 may include one or more other areas for the sender to provide information. For example, in the particular embodiment shown in FIG. 8, the user interface 802 further includes an area to insert sender information (e.g., a sender name) 814; an area to receive a date and time to transmit the SMS message 816; an area to specify a message type of the SMS message 818; and an area to specify conversion of the SMS message to a voice message using a TTS module 820.

After the sender selects the send button 812 of user interface 802, the SMS message information is sent to a server (e.g., computer system 102 shown in FIG. 1). In the embodiment shown in FIG. 8, an advertisement 810 is then displayed to the sender, as illustrated in user interface 822. In the embodiment shown in FIG. 8, the advertisement 810 is displayed in the same user interface 822. Alternatively, the advertisement 810 may be displayed in a separate user interface (e.g., a pop-up window).

Referring to FIG. 9, another embodiment of a user interface is illustrated, at 900. After the sender selects a send button (such as the send button 812 of user interface 802), a send confirmation query 904 and a send confirmation advertisement 906 are displayed to the sender, as illustrated in user interface 902.

Referring to FIG. 10, another embodiment of a user interface is illustrated, at 1000. After the sender selects a send button (such as the send button 908 of user interface 902), a subsequent advertisement 1004 is then displayed to the sender, as illustrated in user interface 1002. In the particular embodiment illustrated in FIG. 10, the user interface 1002 displays a confirmation message 1006 indicating that the SMS message was sent to the recipient.

Thus, as shown in FIG. 9 and FIG. 10, an advertiser can display two advertisements to a single sender. The send confirmation advertisement 906 in FIG. 9 is displayed prior to the advertisement 1004 in FIG. 10. In an illustrative embodiment, the send confirmation advertisement 906 is a generic advertisement displayed to all senders, regardless of the characteristics of the sender, the message, the recipient, or other characteristics. Such a generic advertisement may allow an advertiser to reduce advertising expenses compared to advertisements targeted based on particular characteristics (i.e., target demographics, target context). The advertisement 1004 shown in FIG. 10 may be selected based on one or more characteristics, as described above.

The various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and features have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods or algorithms described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electronically erasable programmable read-only memory (EEPROM), registers, hard disk, a removable disk, a compact disc (CD) ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an application specific integration circuit (ASIC). The ASIC may reside in a computing device, a user terminal, or a telephone. In the alternative, the processor and the storage medium may reside as discrete components in a computing device, user terminal, or telephone.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
    a processor;
    a message receiving module to receive short messaging service (SMS) message data, wherein the SMS message data is received from a sender via a user interface associated with a particular website, and wherein the SMS message data is to be delivered to a recipient;
    an advertisement selection module executable by the processor to:
        identify data associated with an advertisement campaign, wherein the data includes at least one of a characteristic of the recipient, a characteristic of the sender, and a characteristic of the SMS message data;
        determine whether the sender is classified as a frequent message sender based on a comparison of a total number of messages previously sent by the sender to a threshold number of messages;
        determine whether the sender is classified as a frequent visitor to the particular website based on a comparison of a total number of previous visits to the particular website by the sender to a threshold number of website visits;
        select an advertisement based on the identified data, based on whether the sender is classified as a frequent message sender, based on whether the sender is classified as a frequent visitor to the particular website, and based on at least a portion of the SMS message data; and
        add the sender to an autoresponder cycle, wherein the autoresponder cycle results in presentation of a sequence of other advertisements to the sender, wherein the sequence is determined based at least in part on whether the sender is classified as a frequent message sender;
    a message delivery module to send an SMS message to the recipient, wherein the SMS message includes the SMS message data; and
    an advertisement delivery module to send the selected advertisement to the sender.

2. The system of claim 1, further comprising a voice recognition module responsive to the message receiving module.

3. The system of claim 1, wherein the advertisement is further selected based on at least one characteristic of the sender that is determined based on information received from a service provider or information received from a sender device.

4. The system of claim 3, wherein the at least one characteristic of the sender includes at least one of a name, a location, an interest, a time zone, a type of network connection, a gender, a content of a visited website, and a social class.

5. The system of claim 3, wherein the characteristic of the sender includes a climatic condition associated with a location of the sender.

6. The system of claim 1, wherein the advertisement is further selected based on at least one characteristic of the recipient that is determined based on information received from a service provider or information received from a recipient device.

7. The system of claim 6, wherein the at least one characteristic of the recipient includes at least one of a name, a location, an interest, a time zone, a type of network connection, a gender, a content of a visited website, and a social class.

8. The system of claim 6, wherein the characteristic of the recipient includes a climatic condition associated with a location of the recipient.

9. The system of claim 1, wherein the characteristic of the SMS message data includes at least one of text data, audio data, and video data.

10. The system of claim 9, wherein the characteristic of the SMS message data further includes at least one of an Internet Protocol (IP) location, a time zone, and a connection type.

11. The system of claim 1, wherein the message receiving module is adapted to communicate via at least one of a short message service (SMS) network, an Internet Protocol (IP) network, a public switched telephone network (PSTN), and a multimedia messaging service (MMS) network.

12. The system of claim 1, wherein the advertisement selection module selects a pre-recorded advertisement.

13. The system of claim 1, wherein the advertisement selection module selects the advertisement according to a template, wherein the template is populated with data including at least one of text data, audio data, and video data provided by an advertiser.

14. The system of claim 13, wherein the template includes one or more avatars, wherein each of the one or more avatars comprises a graphical representation of a character that is adapted to present the selected advertisement to the sender.

15. The system of claim 1, further comprising an advertisement feedback module to receive feedback information related to interaction of the sender with the selected advertisement.

16. The system of claim 1, further comprising: a text-to-speech (TTS) module adapted to convert the SMS message to a voice message; and wherein the message delivery module is adapted to deliver the voice message to the recipient.

17. The system of claim 1, wherein the selected advertisement is further selected based on a number of messages previously sent to the recipient.

18. The system of claim 1, wherein the selected advertisement is further selected based on a number of messages previously sent to the recipient by the sender.

19. The system of claim 1, wherein the sequence is further determined based on whether the sender is classified as a frequent visitor to the particular website.

20. A method, comprising:
receiving short messaging service (SMS) message data by a server, wherein the SMS message data is received from a sender via a user interface associated with a particular website, and wherein the SMS message data is to be delivered to a recipient;
identifying, by the server, data associated with an advertisement campaign, wherein the data includes at least one of a characteristic of the recipient, a characteristic of the sender, and a characteristic of the SMS message data;
determining whether the sender is classified as a frequent message sender based on a comparison of a total number of messages previously sent by the sender to a threshold number of messages;
determining whether the sender is classified as a frequent visitor to the particular website based on a comparison of a total number of previous visits to the particular website by the sender to a threshold number of website visits;
generating, by the server, an advertisement based on the identified data, based on whether the sender is classified as a frequent message sender, based on whether the sender is classified as a frequent visitor to the particular website, and based on at least a portion of the SMS message data;
sending the advertisement from the server to the sender;
sending an SMS message from the server to the recipient, wherein the SMS message includes the SMS message data; and
adding the sender to an autoresponder cycle, wherein the autoresponder cycle results in presentation of a sequence of other advertisements to the sender, wherein the sequence is determined based at least in part on whether the sender is classified as a frequent visitor to the particular website.

21. The method of claim 20, wherein the advertisement comprises at least an audio portion.

22. The method of claim 21, wherein the audio portion is generated by a text-to-speech (TTS) module.

23. The method of claim 21, wherein the advertisement further comprises at least one of a video portion and a text portion.

24. The method of claim 22, wherein the TTS module identifies a language associated with the SMS message data and generates the audio portion based on the identified language.

25. The method of claim 24, wherein the identified language is one of a plurality of languages, and the TTS module uses a distinct voice to generate speech for each of the plurality of languages.

26. The method of claim 20, wherein sending the advertisement from the server to the sender comprises sending the advertisement after the sender performs an action.

27. The method of claim 26, wherein the action comprises a mouse movement near a top corner of a window.

28. The method of claim 20, wherein the advertisement and the SMS message are sent at substantially the same time.

29. The method of claim 20, wherein sending the advertisement from the server to the sender occurs after sending the SMS message to the recipient.

30. The method of claim 20, wherein sending the advertisement from the server to the sender occurs after receiving a delivery confirmation message confirming delivery of the SMS message to the recipient.

31. The method of claim 20, wherein the user interface is associated with a web page, the method further comprising parsing the SMS message data to determine whether the SMS message data includes text that matches at least one word displayed on the web page, wherein the web page is adapted to display the advertisement upon the sender mousing over the at least one word.

32. The method of claim 20, further comprising assigning credits to the sender in the form of free SMS messages or reduced fee SMS messages in response to determining that the sender is classified as a frequent message sender.

33. The method of claim 20, wherein the sequence is further determined based on whether the sender is classified as a frequent message sender.

34. The method of claim 20, further comprising receiving feedback information related to interaction of the sender with the advertisement.

35. The method of claim 20, further comprising:
upon receiving the SMS message data at the server, generating a send confirmation query and a generic send confirmation advertisement;
sending the send confirmation query and the generic send confirmation advertisement from the server to the sender; and
upon receiving an affirmative response from the sender to the send confirmation query, sending the advertisement from the server to the sender and sending the SMS message from the server to the recipient, wherein the advertisement is different from the generic send confirmation advertisement.

36. The method of claim 20, further comprising:
converting the SMS message to a voice message using a text-to-speech (TTS) module; and
sending the voice message from the server to the recipient.

37. The method of claim 20, wherein the characteristic of the sender includes a climatic condition associated with a location of the sender.

38. The method of claim 20, wherein the characteristic of the recipient includes a climatic condition associated with a location of the recipient.

* * * * *